United States Patent [19]

Phillips et al.

[11] 4,011,759
[45] Mar. 15, 1977

[54] DIFFERENTIAL PRESSURE GAUGE

[75] Inventors: James W. Phillips; Terrence J. Troyer, both of Michigan City, Ind.

[73] Assignee: Dwyer Instruments, Inc., Michigan City, Ind.

[22] Filed: Dec. 11, 1975

[21] Appl. No.: 639,969

[52] U.S. Cl. .......................... 73/407 R; 73/DIG. 5; 116/114 K
[51] Int. Cl.² .......................................... G01L 7/08
[58] Field of Search .......... 73/407 R, 407 PR, 418, 73/406, DIG. 5; 250/231 P, 209, 231 R; 116/114 K, 114 PV, 129 R

[56] References Cited

UNITED STATES PATENTS

| | | | |
|---|---|---|---|
| 3,373,614 | 3/1968 | Neyer | 116/114 PV |
| 3,645,140 | 2/1972 | Phillips et al. | 73/407 R |
| 3,862,416 | 1/1975 | Phillips et al. | 250/231 P |

*Primary Examiner*—Donald O. Woodiel
*Attorney, Agent, or Firm*—McWilliams & Mann

[57] ABSTRACT

A differential pressure gauge of the type comprising a controlling magnetic helix device carrying a pressure indicating arm, the position of which is controlled by a magnet mounted on the free end of a cantilevered leaf spring actuated by a pressure diaphragm exposed to differential pressures. While the helix is preferably of the monoflange or single lobe type, either single or double lobe forms may be employed and they cooperate with a parallelepiped shaped magnet having a planar pole face paralleling the axis of the helix and defining a magnetic axis that is normal to and intersects the helix axis. The magnet and helix are closely spaced, and the magnet is formed from a suitable high energy product type material. The gauge housing defines an integral one piece pressure wall that separates the helix from the magnet and defines within the gauge housing pressure cavity an operating space within which the magnet and its supporting leaf spring are mounted and operate. Between the helix and the magnet the pressure wall is of film dimensions and is contoured to stress in bending.

16 Claims, 13 Drawing Figures

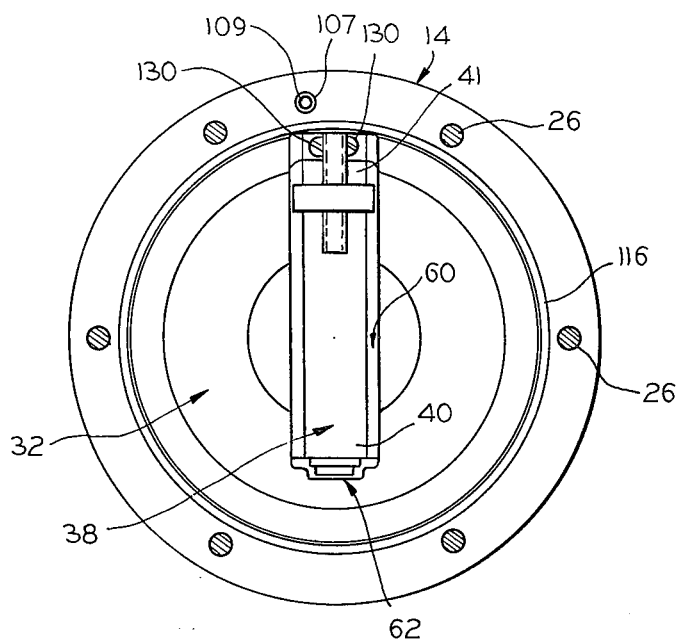
FIG. 3
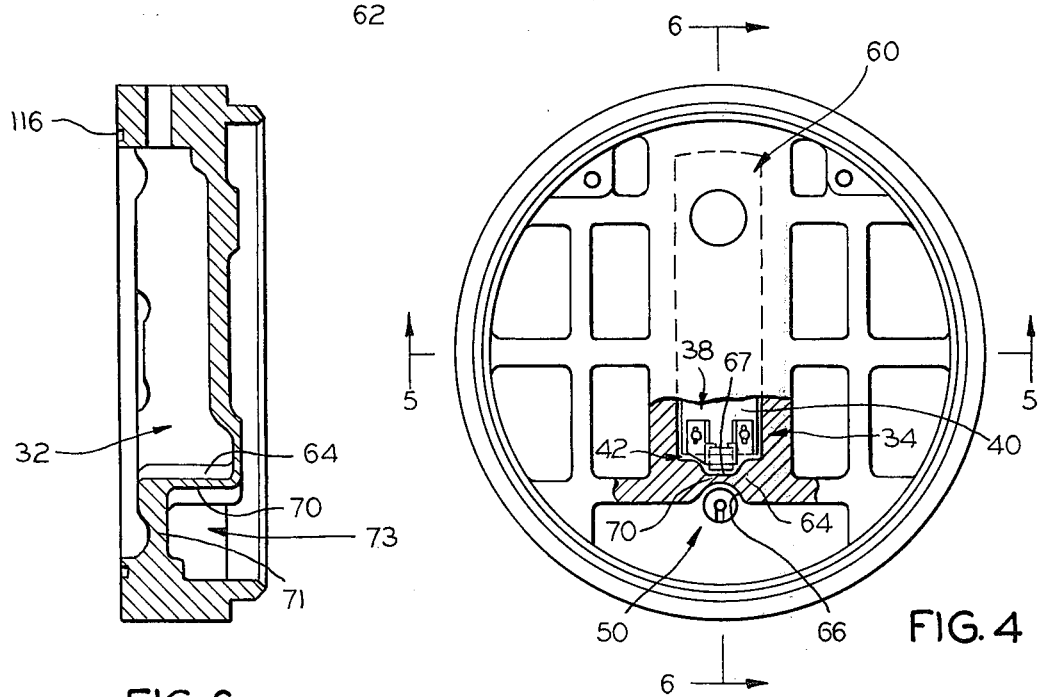
FIG. 6
FIG. 4
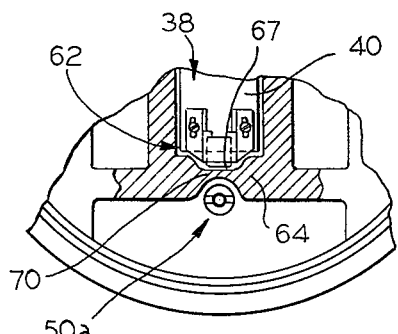
FIG. 4A
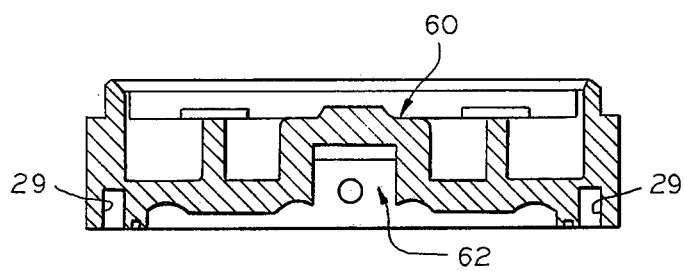
FIG. 5

DIFFERENTIAL PRESSURE GAUGE

DIFFERENTIAL PRESSURE GAUGE

This invention relates to pressure gauges, and more particularly to sealed capsule type differential pressure gauges of the general type shown in Phillips and Zoludow Pat. No. 3,645,140 that include a flexible diaphragm that is to be exposed to differential pressures to operate a sensitive and accurate motion transmitting indicator mounted in the capsule. In the arrangement of said patent, the motion transmitting device is in the form of a pivotally mounted helix cooperating with the magnet to indicate differential pressures and changes therein by movement of the magnet through a linkage connection to the diaphragm. Said patent shows several ways to mount the helix to achieve this end including a wishbone mounting arrangement accommodating zero setting of the helix mounted indicator arm. A similar arrangement is shown in Phillips and Zoludow U.S. Pat. No. 3,862,416 relating to a pressure indicator and switch arrangement. The disclosures of these patents are incorporated herein by this reference.

The helix conventionally employed in motion transmitting devices of the type indicated generally involve a double edged helix, that is, one defining oppositely disposed helically contoured flanges or lobes on either side of the helix, cooperating either with a horseshoe magnet that embraces the helix, or a plate type magnet that may have a flux concentrating plate disposed to cooperate with one of the helix edges. As the mass of the helix and the orientation of the magnetic lines of force acting on same are critical aspects of the sensitivity of the device, it is important that these components have such aspects arranged to maximum benefit for improving the sensitivity of the device.

In devices of the general type under consideration, it is desirable to avoid having the helix and its indicating arm operate subject to the higher pressures to which the gauge may be exposed, and thus the helix and operating magnet therefore are ordinarily mounted in the low pressure chamber of the gauge, for instance, as shown in said U.S. Pat. No. 3,645,140. However, where the gauge is to be used in total pressure (applied to the gauge) ranges from 500 to 1,500 psig. or more; both pressure sides of the gauge will be under relatively high pressures, requiring special mounting of the helix to keep it in an operating pressure environment that will insure maximum sensitivity and accuracy.

One way of isolating the helix from the gauge high pressure is to mount it in a separate tubular housing that forms a well within the gauge pressure chamber, within which the helix operates but free of the pressure chamber pressures. One such arrangement is shown in Neyer U.S. Pat. No. 3,373,614. However, arrangements of this type involve a separate mounting from the tubular housing that forms the well, as well as journaling of the helix inside the housing, which necessarily involves extra parts and machining and assembly operations that are preferably avoided.

A principal object of the present invention is to revise the relationship of the helix and magnet, in gauges of the type indicated, to improve the sensitivity and accuracy of same.

Another principal object of the invention is to provide a differential pressure gauge especially suited for higher total pressure use, in which the helix operates outside of the gauge pressure cavity without requiring the conventional "well" construction.

Another important object of the invention is to provide a differential pressure gauge arrangement for higher total pressure use of improved sensitivity and involving an arrangement of the gauge housing which accommodates disposing the helix exteriorly of the gauge pressure cavity without requiring separate components of special machining for that purpose, and which permits the use of the wishbone type mounting of the helix that is shown in said U.S. Pat. Nos. 3,645,140 and 3,862,416.

Still other objects of the invention are to provide an improved magnetically coupled motion transmitting arrangement for differential pressure gauges utilizing a high energy product parallelepiped type magnet, to provide a differential pressure gauge arrangement for use under pressures of up to 1,500 psig., and to provide a differential pressure gauge that is economical of manufacture, convenient to install and use, and long lived in operation.

In accordance with the invention, a differential pressure gauge is provided comprising a housing arranged to mount the helix on a wishbone for cooperation with a leaf spring mounted magnet, in which the helix is characterized by having a single or double helically contoured side edges disposed for cooperation with the magnet, the latter being in the form of a parallelepiped shaped body presenting a planar pole face disposed in a plane paralleling the pivotal axis of the helix and having a magnetic axis that extends normally of its said pole face, with the magnet being oriented so that its magnetic axis intersects the pivotal axis of the helix at right angles thereto. In the case of the helix with the single helically contoured side edge, the helix and the magnetic pole face are proportioned so that the side edge is substantially aligned, in the plane of the magnet that includes its magnetic axis, with one or the other of the diagonally located pairs of pole face corners. The gauge housing is formed with an integral pressure wall that in part defines the pressure cavity of the housing and separates the magnet from the helix. The magnet and helix are disposed closely adjacent to each other with the portion of the pressure wall separating same defining oppositely disposed concave surfaces between which the pressure wall is of film dimensions to define a closed pressure resisting magnetic flux passing "window" through which the magnetic flux acts on the helix. The pressure wall in question is formed to define a chamber portion within the housing pressure cavity that receives the magnet and accommodates the movement it has to have for devices of the type.

This arrangement accommodates the mounting of the helix exteriorly of the housing pressure cavity without need for the prior art type well (and its disadvantages), while permitting the zero adjust arrangement provided by wishbones of the type shown in said U.S. Pat. Nos. 3,645,140 and 3,862,416 to be employed.

Other objects, uses, and advantages will be obvious or become apparent from a consideration of the following detailed description and the application drawings.

In the drawings:

FIG. 3 is a view of the gauge housing member, taken along line 3—3 of FIG. 2, with the diaphragm and associated parts omitted;

FIG. 4 is a plan view of the top side of the gauge housing member, looking in the direction of the arrows of line 4—4 of FIG. 2, with the housing cover, the indicator scale and helix pointer arm, and the wishbone and other associated parts omitted, but showing the helix disposed in its operating position in a diagrammatic manner;

FIG. 4A is a fragmental view corresponding to that of FIG. 4 but showing a modified embodiment;

FIG. 5 is a sectional view of the gauge housing member per se taken substantially along line 5—5 of FIG. 4;

FIG. 6 is similar to FIG. 5 but taken substantially along line 6—6 of FIG. 4;

However, it is to be distinctly understood that the specific drawing illustrations provided are supplied primarily to comply with the requirements of the Patent Laws, and that the invention is susceptible of other embodiments that will be obvious to those skilled in the art, and which are intended to be covered by the appended claims.

GENERAL DESCRIPTION

Figure 1:
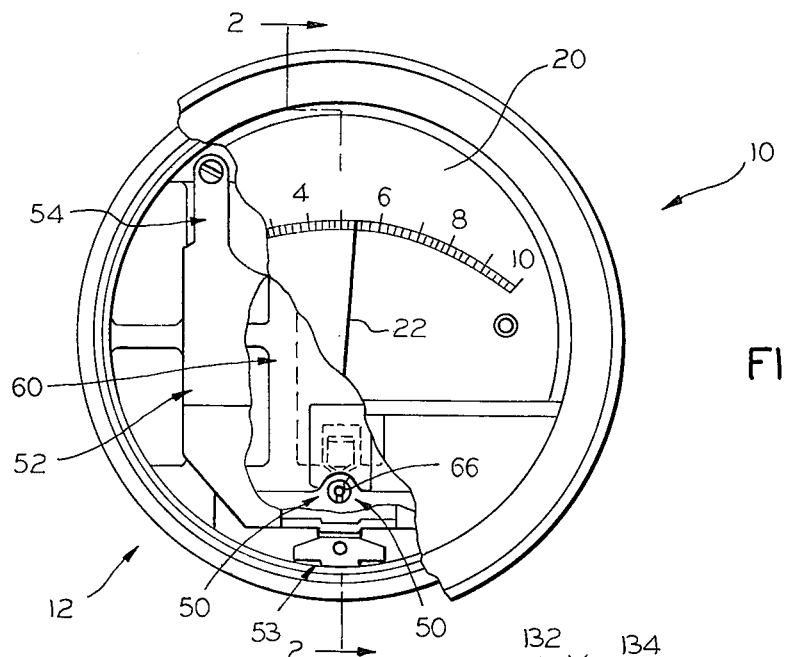
FIG. 1 is a top plan view of one embodiment of the invention with parts broken away to expose other parts, including the helix and gauge pressure wall, which are shown in plan.
Figure 2:
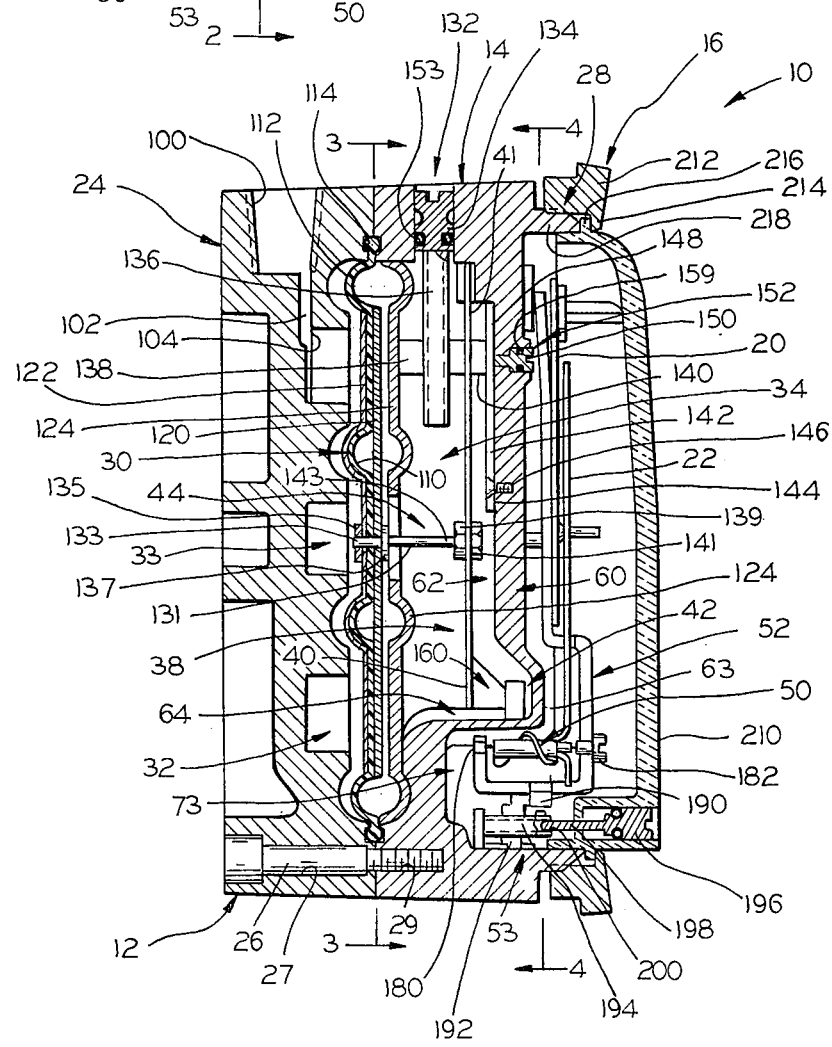
FIG. 2 is a transverse cross-sectional view taken substantially along line 2—2 of FIG. 1.

Reference numeral 10 of FIGS. 1 and 2 generally indicates a differential pressure gauge arranged in accordance with the invention comprising a housing 12 including a housing member 14 that has applied to the front or upper side of same a cover 16 through which is visible the dial plate 20 of the gauge with which the gauge pointer arm 22 cooperates.

On the back side of the housing member 14 is a base plate 24. The housing member 14 and base plate 24 are in the form of separate castings shaped in the manner indicated in the drawings and adapted for securement together by employing suitable screws 26 received through openings 27 formed in the base plate and threaded into threaded openings 29 of the housing member. The cover 16 is threadedly secured in place where indicated at 28.

The gauge 10 is of the general type shown in said U.S. Pat. Nos. 3,645,140 and 3,862,416, and thus includes a diaphragm 30 mounted between the housing member 14 and base plate 24. The housing member 14 and the base plate 24 are shaped to define a pressure cavity 32 across which the diaphragm 30 is mounted to define the pressure cavity 32 into separate pressure chambers 33 and 34 on either side of the diaphragm, with the housing member 14 and base plate 24 being suitably formed to connect the respective chambers 33 and 34 to the sources of differential pressures to be measured by the gauge 10 (chamber 34 being connected to the higher pressure source).

The gauge 10 includes a range spring 38 cantilever mounted, at its end 41, within the cavity 32, and specifically within the chamber 34 to support a magnet 42 (at its end 40) that is of special significance insofar as the present invention is concerned.

The range spring 38 is connected to the diaphragm 30 by a suitable linkage 44 (of the type shown in U.S. Pat. No. 3,862,416) so that variations in pressure in the respective chambers 33 and 34 will be translated by corresponding movement of the diaphragm 30 into movement of the leaf spring 38 and specifically at the free end 40 of the leaf spring on which the magnet 42 is mounted.

Gauge 10 includes (in its preferred form) a novel single lobe helix 50 journaled for rotation about its longitudinal axis in support frame 52 that forms the so-called wishbone, similar to the corresponding arrangement of U.S. Pat. No. 3,862,416, which support frame is cantilever mounted at its legs portions 54 (see FIG. 1 where only one is shown) to support the helix 50 for movement to the right or left of FIG. 2 relative to the housing member 14.

The pointer arm 22 is suitably fixed to the helix so that when the helix 50 rotates about its longitudinal axis, the position of the pointer will change relative to the gauge plate 20 to give a differential pressure reading on the scale indicia there indicated (see FIG. 1). The helix 50 moves in this manner on movement of the magnet 42 to the right or to the left of FIG. 2 under the action of differential pressures in the chambers 33 and 34, or on movement of the support frame 52 relative to the housing member 12 by operation of the zero adjust device 53, which is of the general type disclosed in said U.S. Pat. No. 3,862,416.

In accordance with the invention, the housing member 14 is formed to define a pressure wall 60 which in part defines the pressure cavity 32 and high pressure chamber 34. More specifically, the pressure wall 60 is shaped to define an elongate chamber portion or recess 62 in which the range spring 38 is disposed when mounted in its operative position. Wall 60 transversely of the chamber portion or recess 62 is of generally U-shaped configuration (see FIG. 5) and adjacent the location of the helix 50, it is indented, on the pressure side of same, as at 63, to receive the magnet 42.

Adjacent the indentation 63 pressure wall 60 defines a special cross wall portion indicated at 64 that has the general cross-sectional configurations indicated in FIGS. 2, 4, and 6 whereby the wall portion 64 is formed to define an external concavely rounded indentation or recess 66 in which the helix 50 is disposed. Wall portion 64 within the recess 62, and thus within the pressure chamber 32, defines concavely rounded indentation 67 into which the magnet 42 extends for cooperation with the helix 50.

As brought out in FIGS. 2, 4, and 6 the concavely rounded indentations 66 and 67 are elongate lengthwise of the helix and extend in substantial parallelism longitudinally of the axis 76 of rotation of the helix. The indentations 66 and 67 shape the pressure wall portion 64 to define a segment 70 of film proportions or dimensions which acts as a magnetic flux passing "window" through which the magnetic flux of the magnet 42 acts in controlling the position of the helix 50.

As clearly shown in the drawings, the pressure wall segment 70 is fully integral with the pressure wall 60 about the segment 70. Pressure wall 60 adjacent the base of segment 70 merges integrally with the recess ledge or shelf 71 that is defined by the housing member 14 to form the operating space 73 in which the helix 50 and associated parts are to be disposed. Indentation 66 is preferably shaped such that it encompasses no more than about one-half the circumference of the helix 50.

Further in accordance with the invention, the magnet 42 is of parallelepiped configuration defining oppositely facing pole faces 72 and 74 (see FIGS. 7– 10) that are planar in configuration; magnet 42 is disposed to have the planes of pole faces 72 and 74 disposed parallel to the axis 75 of pivotal movement of the helix 50. The magnet 42 is magnetized to define a magnetic axis 76 which extends perpendicular to the respective pole faces 72 and 74 and through which the magnet magnetic lines of force are oriented. The magnet 42 is mounted so as to dispose its magnetic axis 76 in substantial right angled intersecting relation to the helix pivotal axis 75. The magnet pole face 72 that faces the helix may be either a south pole or a north pole of the magnet, in which case the opposing pole face 74 is of opposite polarity.

Of course, the materials from which the housing 12, base plate 24, and bezel 212 of cover 16 are formed are of the non-magnetic type, such as aluminum or brass or alloys of same that are non-magnetic.

Further in accordance with the invention, the helix 50 is formed to define a single or mono-helical edge 80. In the form shown (see FIGS. 7 and 10), the helix generally comprises a cylindrical spindle portion 82 having a single spirally contoured flange or lobe 84 that defines the spherical edge 80. Helix 50 is formed from a suitable magnetic material, such as steel.

In accordance with the single lobe helix embodiment of the invention, the helix 50 and magnet 42 are disposed so that the edge 80 of the flange or lobe 84 is spaced approximately 0.060 inch from the face 72, and the pressure wall segment disposed therebetween has a minimum thickness in the range of from approximately 0.030 inch to approximately 0.040 inch.

Figure 9A:
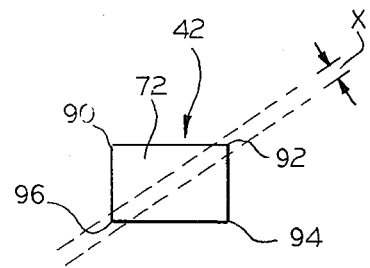
FIG. 9A is a diagrammatic view illustrating the desired proportioning relation of FIG. 9 in terms of the projection of the helix flange edge against the magnet pole face.
Figure 8:
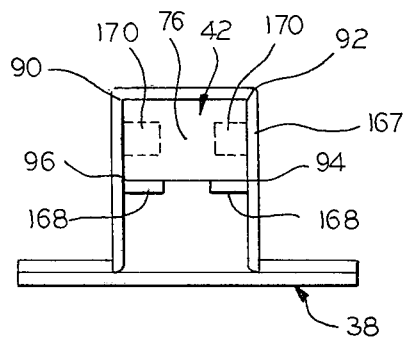
FIG. 8 is an elevational view taken substantially along line 8—8 of FIG. 7.
Figure 9:
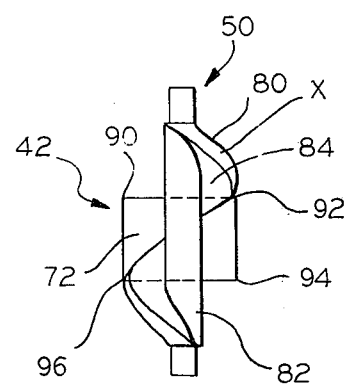
FIG. 9 is a diagram in elevation form illustrating an important proportioning relationship between the helix and the magnet.

Further in accordance with the invention, there is a critical proportioning relationship between the helix helical flange 84 and the pole face 72 for optimum helix positioning torque and resolution. As indicated in FIGS. 8 and 9, the parallelepiped configuration of the magnet 42 gives the pole face 72 a quadrilateral configuration defining corners 90, 92, 94 and 96. The pitch of the helix 84 and its radius of generation should be such that when the pole face 72 and helix 50 are viewed as indicated in FIG. 9, the projection of the helix in the plane of the magnet (that includes its magnetic axis 76) includes two diagonally opposed corners of the pole face 72 (and thus the corners 92 and 96 where the helix has the hand indicated in the drawings). Also, the indicated diagonally opposite corners of the pole face should be aligned approximately with the mid portion of projection of the flange edge 80 against the pole face 72 as diagrammatically illustrated in FIG. 9A, and the helix edge 80 should have thickness dimension X such that the said edge projection on face 72 overlaps the diagonal connecting such corners (92 and 96), on either side of such diagonal, that lies in the range of from about 1/10th to about 1/3rd the length of such diagonal.

Figure 10:
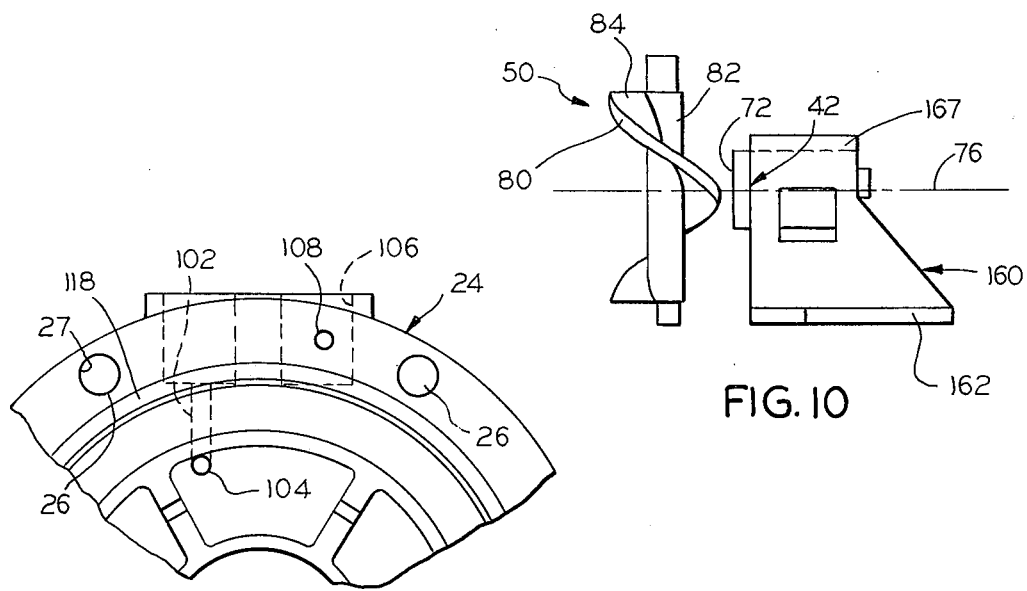
FIG. 10 is an elevational view taken substantially along line 10—10 of FIG. 7.

As indicated in FIG. 9 and 10, the helix flanges 84 is a 360 degree turn to make the helix mass balanced. The magnetic lines of flux emanating from the magnet face 72 are concentrated on the flange 84 and by reason of its close and balanced disposition relative to the pole face, and because there is no second flange to detract from the magnetic attraction involved, the magnetic coupling of the helix to the magnet is singularly effective.

Figure 7:
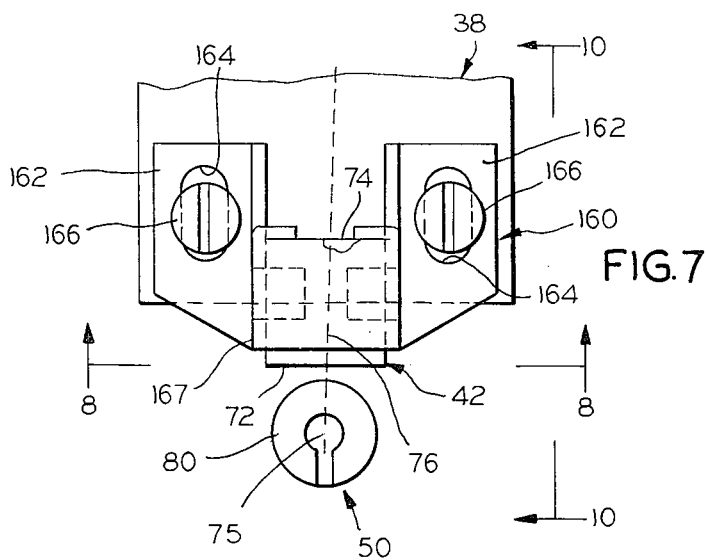
FIG. 7 is a diagrammatic plan view of the magnet and helix on an enlarged scale.

In operation, the high and low pressure connections of the gauge are suitably connected to a source of high and low pressure which apply differential pressures on the diaphragm 30, with the resulting deflection of the diaphragm moving the leaf spring 38 through linkage 44 to shift the magnet 42 proportionately, thereby achieving a corresponding pivotal action of the helix 50. As the magnetic flux tends to keep the helix flange 84 in the closely spaced relation to the magnetic pole face 72 that is indicated in FIGS. 7, 9 and 10, movement of the magnet 42 longitudinally of the helix pivotal axis will result in pivotal movement of the helix 50 to thereby change the position of the helix indicating arm relative to the dial plate 20, but without changing the positioning relationships shown in FIGS. 8 and 9A, due to the magnetic coupling involved.

The pressures in the high pressure chamber 34 are fully shielded from the helix 50, while at the same time the proportioning of the pressure wall portion 70 accomodates transmission of the magnet lines of flux therethrough for the desired magnetic coupling effect on the helix 50. The film dimensions of the pressure wall portion 70 are possible due to the rounded configurations of indentations 66 and 67 and the unitary connection that wall segment 70 has with the basic pressure wall 60. The shaping of the parts involved results in the wall portion 70 being placed in bending under the pressures within the chamber 34, thereby avoiding undue stress on the magnetic window of the pressure wall.

Where the housing member 14 and base plate 24 are formed from aluminum, the housing 12 accommodates total pressures as high as 1000 psi. By utilizing high strength alloys such as manganese bronze or aluminum bronze higher total pressure may be obtained.

While the indicated arrangement of magnet 42 and helix 50 are especially well suited in connection with gauges of the type formed with the indicated pressure wall 60, their effectiveness as a motion transmitting coupling is fully usable in gauges of the type shown in said U.S. Pat. Nos. 3,645,140 and 3,862,416, as will be apparent to those skilled in the art.

While the single lobe helix 50 is preferred, the general arrangement involved provides significant advantages using a double lobe helix; FIG. 4A is illustrative of such an arrangement, showing double lobed helix 50A of like diameter and convolution, substituted for the single lobe helix 50, with all other parts being the same.

SPECIFIC DESCRIPTION

The housing member 14 and the back plate 24 are formed in any suitable manner to the shapes indicated in the drawings, suitable casting procedures being employed in a preferred embodiment. These components may be formed with suitable reinforcing webbing, and the like for providing the desired structural integrity, such as that illustrated.

Figure 11:
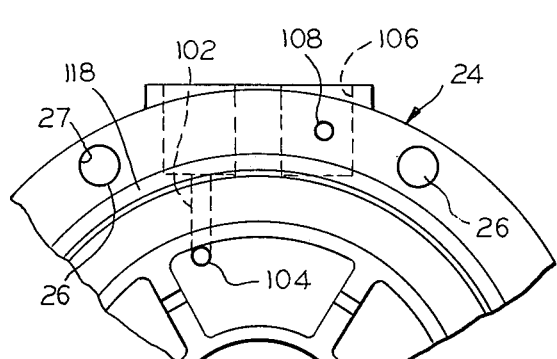
FIG. 11 is a fragmental view of the gauge base plate.

In the form shown, the high and low pressure connections are made to the base plate 24, the base plate being formed with a socket 100 (see FIGS. 2 and 11) communicating with low pressure passageway 102 which communicates with the low pressure chamber 33 through a port 104. Threaded socket 106 communicates directly with high pressure passageway 108 that suitably communicates, as through an O-ring seal (not shown but interposed between member 14 and base plate 24 as by being lodged in recess 107 of member 14) with a correspondingly located passageway 109 in housing member 14 communications with the high pressure chamber 34.

The diaphragm 30 is formed from a suitable elastomeric material and defines an inner annular flexing indentation 110, an outer annular flexing indentation 112, and a marginal rim 114 of O-ring configuration that is received between the housing member 14 and base plate 24, and within their respective annular recesses 116 and 118 that oppose each other in the assembled relation of the gauge.

In the form shown in the drawings, the diaphragm 30 has its inner indentation 110 made rigid by front plate 120 and back plate 122 for low pressure applications. The outer indentation 112 alternately may be made rigid in a similar manner for higher differential pressure range applications.

Mounted over the diaphragm front plate 120 is filler plate 124 against which housing member 14 is seated on either side of the leaf spring 38 as well as adjacent the free end of the leaf spring in the manner indicated in FIG. 2.

the diaphragm 30 may be formed with suitable reinforcing ribs and headed studs for frictional application to openings in the illustrated diaphragm plates, in the manner disclosed in said U.S. Pat. No. 3,645,140.

Linkage 44 comprises rod element 131 having its end 133 secured to the diaphragm by nuts 135 and 137 applied to element 131 on either side of plates 120 and 122, to clamp the diaphragm in leakage free relation therebetween. Nuts 139 and 141 appied to the other end 143 of element 131 connect element 131 to spring 38.

The range spring 38 has its fixed end 41 anchored to the housing member 14 by suitable screws 130. The range spring 38 is calibrated by an adjustment device 132 of the general type disclosed in said U.S. Pat. No. 3,645,140 comprising a screw member 134 having a threaded portion 136 which threadedly receives slide element 138 that engages one side of the spring 38. On the other side of the spring 38 a spacer 140 is interposed between the spring 38 and a cantilever mounted clamping plate 142 that has its end 144 secured to the housing member by appropriate screws 146, and its other end 148 free to move under the action of a set screw 150 threadedly mounted in a housing member 14. The set screw 150 and clamping plate 142 form a lock device 152 for locking the spring 38 at a desired position of adjustment, while the device is being assembled. Screws 134 and 150 are provided with suitable fluid seals of the O-ring type where indicated at 153 and 159, respectively.

The magnet 42 in the illustrated embodiment is mounted in a bracket 160 (see FIGS. 7, 8 and 10) of generally U-shaped configuration defining a pair of spaced apart mounting flanges 162 suitably apertured as at 164 to receive mounting screws 166 that secure the bracket 160 to the spring 38. The bracket 160 defines a magnet housing portion 167 shaped to define magnet supporting tabs 168 on either side of same and a pair of magnet positioning tabs 170 at the back side of same which locate the amount the magnet pole face 72 protrudes. Magnet 42 is suitably bonded to the tabs 168 and 170.

The magnet 42 is preferably formed from a suitable high energy product material, such as the samarium cobalt (using powdered metal formulation techniques) product sold under the trademark HICOREX by Hitachi Magnetics Corp., Edmore, Michigan. An energy product in the range of from about 14 to about 18 million gauss . oersteds is preferred.

The helix support frame 52 preferably is of the type disclosed in said U.S. Pat. No. 3,862,416, and operably journals the helix 50 between fixed bearing 180 and an adjustable bearing 182.

In the single lobe helix form of the invention, the dimension X of helix edge 80 preferably is in the range of from 0.025 inch to 0.030, with the pole face 72 being 0.200 inch wide and 0.120 inch high.

Operably associated with the support frame 52 is the zero adjust device 53 that is of the general type disclosed in said U.S. Pat. No. 3,862,416 and comprises a nut member 192 that engages a shoulder 190 of the frame 52 and is threadedly mounted on adjust screw 194 that is suitably journaled in the housing member 14, and of the general type shown in U.S. Pat. No. 3,397,319, which is actuated by a headed stud member 196 slidably mounted in the cover 16 that includes a hex end portion 198 for reception in the socket 200 of the screw 194. The stud 196 is mounted in leak proof relation with the cover 16, with the spline connections involved in the mounting of the stud member 196 and the cover permitting the zero adjust movement of the free end of the wishbone support that is contemplated by the zero adjust device employed.

The cover 16 comprises a cover member 210 formed from a suitable transparent material held in place by an annular clamp member or bezel 212 threadedly secured to the housing member 14 where indicated at 28, flange portion 214 of the bezel 212 engaging flange 216 of the cover member 210 for this purpose and holding same against the side wall 218 of the housing member 14.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In a gauge that includes linear to rotary motion transforming means including a helix journaled for rotation about its longitudinal axis, with the helix having an indicator connected thereto, a magnet for producing rotational movement of said helix about its said axis in response to linear movement of the magnet alongside and lengthwise of said helix axis, and a housing for the helix and magnet, the improvement wherein:

said magnet has a planar face of quadrilateral configuration, with said magnet being disposed to position said pole face thereof facing the helix, with the plane of the pole face extending parallel to the helix axis, said helix being formed to define one helically contoured edge projecting therefrom in uniformly spiralled relation thereto, said helix edge and said magnet pole face being in close adjacency, said pole face defines a first pair of opposed sides that parallel said axis of said helix, and a second pair of opposed sides that are respectively normally disposed relative to said pole face first pair of opposed sides, whereby said pole face defines right angle corner portions, said magnet defining a magnetic axis extending perpendicular to said pole face, said magnet being disposed relative to said helix such that said magnetic axis substantially intersects said helix axis, said helix edge being contoured to dispose the portion of same that is adjacent said pole face in substantial alignment with a pair of oppositely disposed corner portions of said pole face, laterally of said helix axis in the direction of said pole face.

2. The improvement set forth in claim 1 wherein: said helix edge has a thickness along its margin lying in the range of from approximately 1/10th to approximately ⅓rd the length of a diagonal connecting said pole face corner portions.

3. In a gauge that includes linear to rotary motion transforming means including a helix journaled for rotation about its longitudinal axis, with the helix having an indicator connected thereto, a magnet for producing rotational movement of said helix about its said axis in response to linear movement of the magnet alongside and lengthwise of said helix axis, and a housing for the helix and magnet, with the housing defining a differential pressure chamber in which the magnet is mounted, and including sensing means mounted in said pressure chamber for shifting said magnet lengthwise of said helix in response to differential pressure changes in said chamber, said magnet has a planar pole face of quadrilateral configuration, with said magnet being disposed to position said pole face thereof facing the helix, with the plane of the pole face extending parallel to the helix axis, said helix being formed to define a spindle portion having one or more helically contoured flanges project-laterally thereof in spiralled relation thereto, said helix flanges and said magnet pole face being in close adjacency, said housing being formed to define a pressure wall structure of non-magnetic material separating said pressure chamber from said helix and forming a chamber portion in which said magnet is disposed, said wall structure having a portion disposed between said helix and said magnet that is elongate longitudinally of the axis of said helix and defines a non-magnetic medium that separates said helix from said magnet, said wall portion defining opposed concave surfaces extending longitudinally of the helix axis respectively facing the magnet and the helix, said wall portion being integral with said wall structure about its margin, and between said concave surfaces, said wall portion being of film dimensions, said wall structure on either side of said wall portion being of relatively thick dimension laterally thereof for bracing said wall portion against the action of pressures in said chamber.

4. The improvement set forth in claim 3 wherein: said helix flange and said pole face have a spacing on the order of 0.060 inch.

5. The improvement set forth in claim 3 wherein: said wall structure is shaped so that said wall portion acts in bending under the action of pressures in said chamber.

6. The improvement set forth in claim 3 wherein: said magnet is of the high energy product type, said pole face defining a first pair of opposed sides that parallel said axis of said helix, and a second pair of opposed sides that are respectively normally disposed relative to said pole face first pair of opposed sides, whereby said pole face defines right angle corner portions, said magnet being disposed relative to said helix such that said magnetic axis substantially intersects said helix axis and is normal relative thereto.

7. The improvement set forth in claim 6 wherein: said helix is of the single flange type, said helix flange being contoured to dispose the portion of same that is adjacent said pole face in substantial alignment with a pair of oppositely disposed corner portions of said pole face, laterally of said helix axis, in the direction of said pole face.

8. The improvement set forth in claim 7 wherein: said helix flange has a thickness along its margin lying in the range of from approximately 1/10th to approximately ⅓rd of the length of a diagonal connecting said pole face corner portions.

9. The improvement set forth in claim 3 wherein: said magnet is mounted on a leaf spring member adjacent one end of said member with said spring member being mounted cantilever fashion at the other end of same, said leaf spring being connected to said sensing means for movement thereby, said wall structure being formed to receive said spring member for free movement of the latter under the action of said sensing means.

10. The improvement set forth in claim 3 wherein: said wall structure encompasses no more than about 50 percent of the circumference of said helix.

11. The improvement set forth in claim 3 wherein: said wall portion surface facing said helix is substantially complemental to the circumferential diameter of the flanges.

12. The improvement set forth in claim 3 wherein: said helix is cantilever mounted for zero adjusting movement longitudinally of its axis relative to said wall structure.

13. In a gauge that includes linear to rotary motion transforming means including a helix journaled for rotation about its longitudinal axis, with the helix having an indicator connected thereto, a magnet for producing rotational movement of said helix about its said axis in response to linear movement of the magnet alongside and lengthwise of said helix axis, and a housing for the helix and magnet, the improvement wherein:

said magnet is of parallelepiped configuration defining oppositely facing planar pole faces of quadrilateral configuration, with said magnet being disposed to position one of said pole faces thereof facing the helix, with the plane of said one pole face extending parallel to the helix axis, said helix being formed to define one helically contoured edge projecting therefrom in uniformly spiralled relation thereto, said helix edge and said one magnet pole face being in close adjacency, said pole face defining a first pair of opposed sides that parallel said axis of said helix, and a second pair of opposed sides that are respectively normally disposed relative to said one pole face first pair of opposed sides, whereby said one pole face defines right angle corner portions, said magnet defining a magnetic axis extending perpendicular to said pole faces, said magnet being disposed relative to said helix such that said magnetic axis substantially intersects said helix axis and is perpendicular thereto, said helix edge being contoured to dispose the portion of same that is adjacent said pole face in substantial alignment with a pair of oppositely disposed corner portions of said one pole face, laterally of said helix axis in the direction of said one pole face.

14. The improvement set forth in claim 13 wherein:
said helix is formed to define a spindle portion and a single helically contoured flange projecting laterally thereof in spiralled relation thereto,
said flange being formed to define said helix edge.

15. The improvement set forth in claim 14 wherein:
said magnet is formed from a high energy product material.

16. The improvement set forth in claim 15 wherein:
said flange is proportioned about said helix axis to balance the mass of said helix about its said axis.

* * * * *